United States Patent [19]

Hernandez

[11] Patent Number: 4,461,139
[45] Date of Patent: Jul. 24, 1984

[54] COTTON SHREDDER

[76] Inventor: Lupe E. Hernandez, P.O. Box 214, Snyder, Tex. 79549

[21] Appl. No.: 393,186

[22] Filed: Jun. 28, 1982

[51] Int. Cl.³ .......................................... A01D 14/02
[52] U.S. Cl. ...................................... 56/14.5; 56/13.3; 56/28; 56/295
[58] Field of Search ................ 56/295, 327 R, 28, 30, 56/16.6, 13.3, 14.5

[56] References Cited

U.S. PATENT DOCUMENTS

| | | | |
|---|---|---|---|
| 271,127 | 1/1883 | Robbins | 56/295 |
| 339,725 | 4/1886 | Wright | 56/28 |
| 1,407,417 | 2/1922 | Huelves | 56/295 |
| 1,894,740 | 1/1933 | Groenig et al. | 56/14.5 |
| 2,843,991 | 7/1958 | Poehls | 56/13.8 |
| 2,891,369 | 6/1959 | Rietz | 56/13.8 |
| 3,095,680 | 7/1963 | Thornton | 56/13.7 |
| 3,596,445 | 8/1971 | Lievers | 56/13.7 |
| 3,600,877 | 8/1971 | McCrary et al. | 56/13.7 |
| 3,762,137 | 10/1973 | Veretto | 56/13.3 |
| 3,800,518 | 4/1974 | Baggiolini et al. | 56/327 R |
| 3,838,559 | 10/1974 | Stang et al. | 56/327 R |
| 3,925,969 | 12/1975 | Shunichi | 56/13.9 |
| 4,166,505 | 9/1979 | West | 56/13.3 |

Primary Examiner—John J. Wilson
Attorney, Agent, or Firm—Wendell Coffee

[57] ABSTRACT

A stalk shredder is mounted upon a cotton stripper, below and immediately behind the cotton stripper. Therefore, the shredder is raised and lowered with the stripper elements and also is in a compact position in relation to the total vehicle. A scythe-shape cutting blade is used.

6 Claims, 5 Drawing Figures

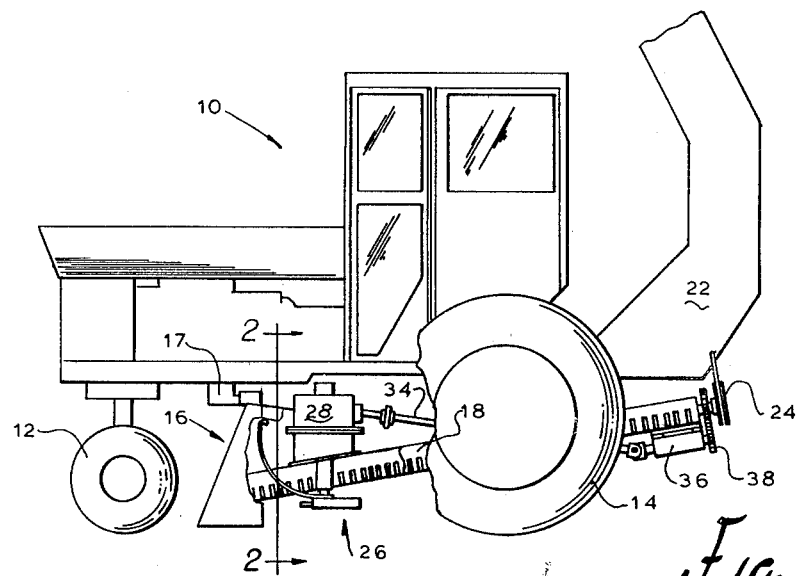
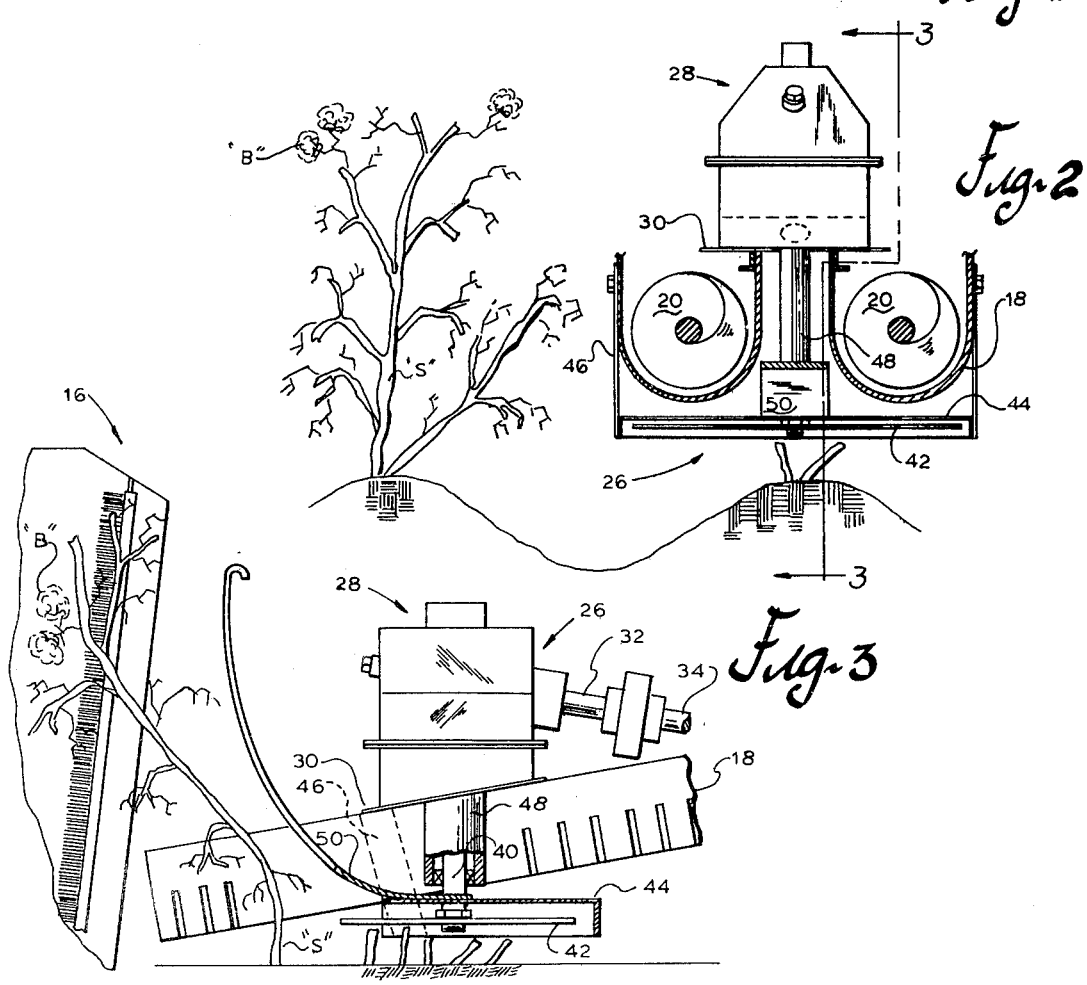

COTTON SHREDDER

BACKGROUND OF THE INVENTION (1) Field of the Invention

This invention relates to harvesters and more particularly to a cotton harvester with a stalk shredder mounted immediately behind the harvester elements.

(2) Description of the Prior Art

Cotton grown in the United States today is mechanically harvested. Also, customarily after the cotton is harvested, the stalks are cut or shredded.

Before my invention, other workers in the field had suggested that the stalk shredder be attached to the harvesting machine. All the previous workers had put this stalk cutting element behind the entire machine. Normally the harvesting element is carried by a vehicle having front wheels and rear wheels, and the harvesting element is normally between the front and rear wheels. However, before my invention, all of the shredders, which were mounted on such harvesters, were mounted behind the rear wheels. Normally, the elevator for elevating the harvested cotton to an overhead basket is mounted behind the rear wheels. By also mounting the shredder behind the rear wheels, this increases the weight behind the rear wheels, which tends to unbalance the machine as a whole, putting too much weight too far to the rear.

Also it is desirable that the stalks be cut as close to the ground as possible. Putting the cutter behind the rear wheels, makes it more difficult to adjust the height of which the cotton stalk is to be cut. Furthermore, putting the shredder behind the rear wheels, extends the total length of the equipment, extending much of the equipment further behind the rear wheels than it would otherwise extend.

McCRARY U.S. Pat. No. 3,600,877 shows a combination of a harvester and shredder.

Before this patent application was made, applicant caused a search of the prior art to be made in the United States Patent and Trademark Office. In addition to McCRARY, the following patents were reported to him in that search.

POEHLS, U.S. Pat. No. 2,843,991
RIETZ, U.S. Pat. No. 2,891,369
THORNTON, U.S. Pat. No. 3,095,680
LLEVERS, U.S. Pat. No. 3,596,445
SHUNICHI U.S. Pat. No. 3,925,969

Applicant does not consider these patents to be pertinent; however, the applicant thought the Examiner would be interested in them inasmuch as they were reported by an experienced patent searcher.

SUMMARY OF THE INVENTION (1) New and Different Function

I have invented a combination of cotton harvester and stalk shredder, wherein the shredder is mounted onto the harvester unit between the front and rear wheels and is attached to the harvester unit so that it is raised and lowered with the normal power lift that raises and lowers the harvester unit. By mounting the cutter unit at this location, I am able to better balance the total tractor, keep the cutter blades closely adjusted in relation to the height of the ground and obtain a better total operation.

Also, by mounting it in this location, I am able to simplify the drive inasmuch as it is more convenient to drive the shredder directly from the harvester mechanism drive when it is located in this position. The stalk shredder remains assembled with the harvester when the harvester is removed from the tractor. A scythe-shaped cutting blade is used. I have found this cuts the stalks better than the straight radial blades or convex blades of the prior art.

Therefore, it may be seen that the total function of my combination far exceeds the sum of the functions of the individual elements such as cutters, gears, shafts, etc.

(2) Objects of this Invention

An object of this invention is to shred cotton stalks immediately after the cotton has been harvested therefrom.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a side elevation of a tractor with a cotton stripper and my new invention mounted thereon with parts broken away and somewhat schematic in representation.

FIG. 2 is a front sectional view taken on line 2—2 of FIG. 1 showing my new stalk cutter.

FIG. 3 is a side sectional view taken substantially on line 3—3 of FIG. 2.

DESCRIPTION OF THE PREFERRED EMBODIMENT

Figure 4:
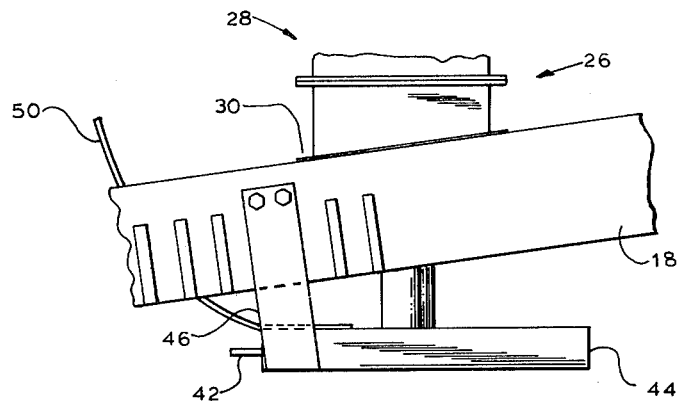
FIG. 4 is a side elevational view of the stalk shredder on the conveyor trough.

Referring to the drawings and more particularly to FIG. 1, there may be seen somewhat schematically represented a tractor 10. The tractor will have front wheels 12 and rear wheels 14. Also not identified by numerals, the tractor obviously will have an engine and operators cab. Also neither shown nor identified would be an overhead basket.

Harvester elements 16 are mounted on the tractor with power lift 17 between the front wheels 12 and rear wheels 14. It is these harvester elements 16 which removes the seed cotton or cotton bolls "B" from the cotton stalks "S".

The harvested seed cotton from harvester elements 16 is dropped into conveyor troughs 18 to be conveyed by augers or conveyors 20 within the troughs to elevator means 22. The elevator means 22 is mounted to the tractor 10 behind the rear wheels 14. The elevator means 22 is for elevating the harvested seed cotton from the conveyor 20 upward to the overhead basket (not shown).

The elevator 22 and the conveyors 20 are driven by V-belt drive 24. It will be understood that the drive for the harvester element 16 themselves are from the V-belt drive 24 through the conveyors 20.

It will be understood that the harvester element 16 is mounted for raising and lowering by power lift mechanism 17 to the tractor 10. The power lift mechanism 17 has been shown schematically for purposes of clarity.

Those having skill in the art will recognize and understand that the harvester described to this point was old, well-known and commercially available on the market long before the invention described herein.

As outlined above, I have found that if stalk shredder 26 is mounted to the conveyor troughs 18 between the front wheels 12 and rear wheels 14 that superior operation is obtained. Specifically a right angled gear unit 28 is bolted to plate 30 extending across the top of the conveyor troughs 18. The input shaft 32 from the gear unit 28 is connected to a universal or tumble shaft 34. This tumble shaft 34 extends rearwardly to be journaled in bearings 36 attached to the rear of the conveyor trough 18. There the rear end of the tumble shaft 34 has transmission means 38 attached thereto which is driven from the augers or conveyors 20. In the specific embodiment shown in the drawings this drive is by a gear drive. However, those having skill in the art will understand there are other type drives that can be used.

Also those skilled in the art will understand that different guards and covers could be provided over the various drives for safety.

Cutter shaft 40 depends vertically from the unit 28. Tube 48 surrounding the shaft 40 from unit 28 supports the bottom of the shaft by a bearing. Stalk cutter 42 is mounted on the bottom of the cutter shaft 40. The front of the cutter 42 must be exposed to cut the stalks "S" however, the middle and rearward portion of the cutter 42 is covered by housing 44. The housing 44 is suspended from the conveyor troughs 18 by a side plate 46 on each side of the housing 44.

Fender 50 is attached to the top of the housing 44 and extend forward and upward to an area just behind the harvester element or unit 16. The fender is made of a spring steel material and serve the purpose of pushing the cotton stalks "S" forward so that they are in the correct and proper attitude to be cut by the cutter 42. The fenders are positioned as shown in FIG. 3.

It will be noted that there are two conveyor troughs 18, which straddle the drill or row of cotton stalks "S". The cutter shaft 40 extends vertically downward between these two troughs so that the cutter 42 is below the conveyor troughs 18. Also, the cutter 42 is between the front wheels 12 and the back wheels 14 of the vehicle 10 carrying the harvester 16.

Since the stalk shredder 26 is mounted upon the conveyor troughs 18, the shredder will be raised and lowered by the power lift 17 along with the harvester elements 16.

Figure 5:
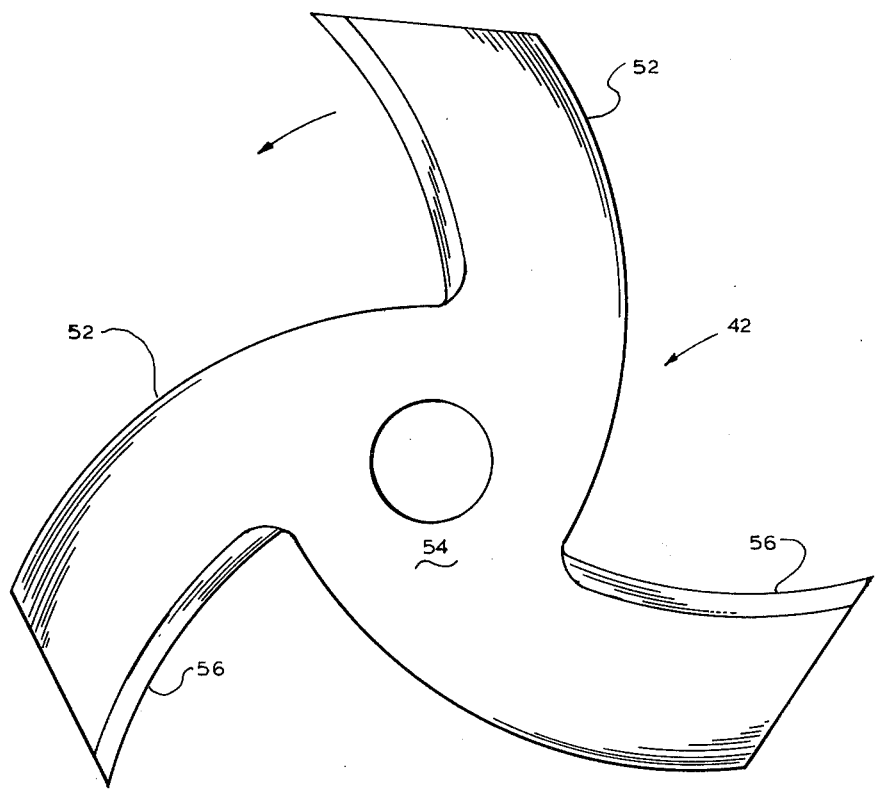
FIG. 5 is a top plan of the cutter.

I prefer to make the blades or scythes 52 of cutter 42 forward curved or hook-shaped. This shape is somewhat similar to a sickle or more precisely a scythe. Specifically, I prefer to use a cutter having a central disk 54 and having three arms or scythes radiating from it. Each arm will have a forward curve forming concave beveled cutting edge 56. I have found that the forward angle of the tip is desirable because it tends to cut the stalks better. I have found that with the normal speed of rotation, that any debris along the cutting edge will be pushed upward by centrifugal force. Also, the concave curve results in the cutting edge 56 being more nearly radial next to the central disk 54. Therefore, as the cutter 42 is rotated, it cuts the stalk more effectively. The cutter blade is more precisely shown in FIG. 5 and is built as shown.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| | |
|---|---|
| "B" seed cotton | 32 input shaft |
| "S" stalks | 34 tumble shaft |
| 10 tractor | 36 bearings |
| 12 front wheels | 38 transmission |
| 14 rear wheels | 40 cutter shaft |
| 16 harvester elements | 42 cutter |
| 17 power lift | 44 housing |
| 18 troughs | 46 side plate |
| 20 conveyors | 48 tube |
| 22 elevator | 50 fenders |
| 24 V-belt drive | 52 blades |
| 26 stalk shredder | 54 disk |
| 28 gear unit | 56 cutting edge |
| 30 plate | |

I claim as my invention:

1. A-cotton harvester stalk shredder combination having:
   a. a vehicle having
   b. ground engaging wheels,
   c. harvester elements below the vehicle for harvesting seed cotton from stalks,
   d. the harvester elements angling from near the ground at the front upward toward the back of the elements,
   e. auger conveyors in
   f. conveyor troughs to receive and move the harvested seed cotton upward and rearward, and
   g. drive means at the upper rear of the conveyors for rotating said conveyors;
wherein the improvement comprises:
   h. a gear unit attached to the conveyor troughs,
   i. a cutter shaft depending vertically downward from the gear unit,
   j. a stalk cutter on the bottom of the cutter shaft,
   k. a right angle gear drive in the gear unit and
   l. a drive shaft extending from the gear unit to the drive means whereby the stalk cutter is driven by the drive means.

2. The invention as defined in claim 1 including all of the limitations a. through l. with the addition of the following limitations:
   m. said gear unit mounted immediately behind the back of the harvester elements so that as soon as the seed cotton is harvested from the stalk, the stalk is cut.

3. The invention as defined in claim 1 including all of the limitations a. through l. wherein the stalk cutter comprises:
   m. a central disk,
   n. scythes radiating from the disk,
   o. each scythe having a curved, concave, sharp, beveled cutting edge.

4. The invention as defined in claim 1 including all of the limitations a. through l. wherein the harvestor has:
  m. a power lift connected to the vehicle for raising and lowering the harvesting elements and conveyor troughs, and the stalk shredder therewith.

5. The invention as defined in claim 4 including all of the limitations a. through m. wherein the stalk cutter comprises:
  n. a central disk,
  o. scythes radiating from the disk,
  p. each scythe having a curved, concave, sharp, beveled cutting edge.

6. The invention as defined in claim 5 including all of the limitations a. through p. with the addition of the following limitations:
  q. said gear unit mounted immediately behind the back of the harvester elements so that as soon as the seed cotton is harvested from the stalk, the stalk is cut.

* * * * *